Figure 1:
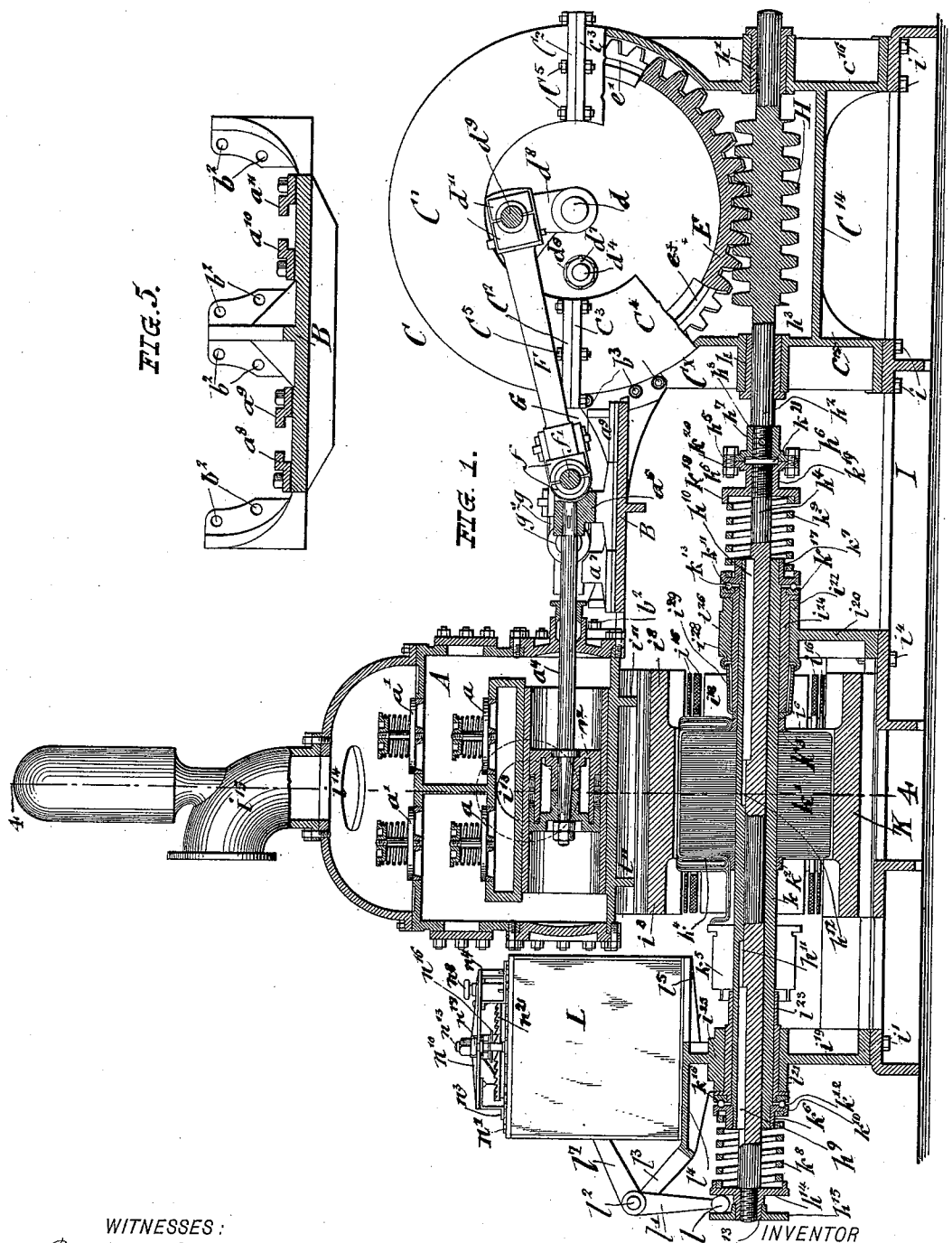

No. 618,404. Patented Jan. 31, 1899.
C. EICKEMEYER.
ELECTRIC PUMP.
(Application filed Jan. 22, 1898.)
(No Model.) 6 Sheets—Sheet 2.

WITNESSES:
Bruno von Bültzingslöwen
Geo. L. Wheelock

INVENTOR
Carl Eickemeyer
BY
ATTORNEYS.

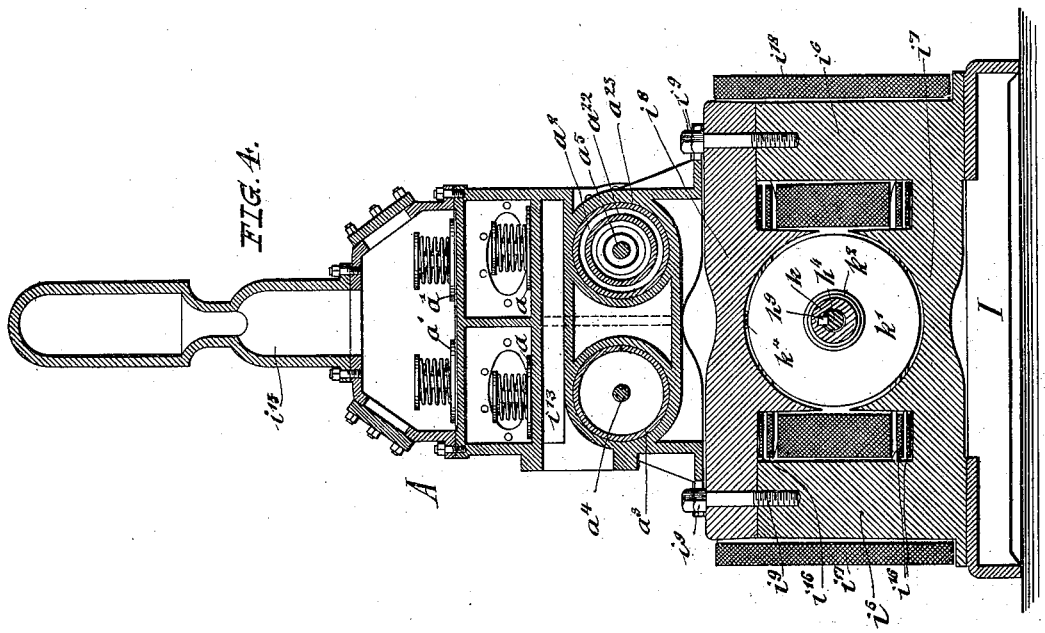

No. 618,404. Patented Jan. 31, 1899.
C. EICKEMEYER.
ELECTRIC PUMP.
(Application filed Jan. 22, 1898.)
(No Model.) 6 Sheets—Sheet 4.
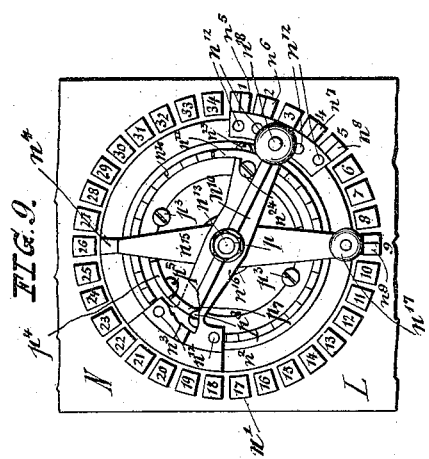
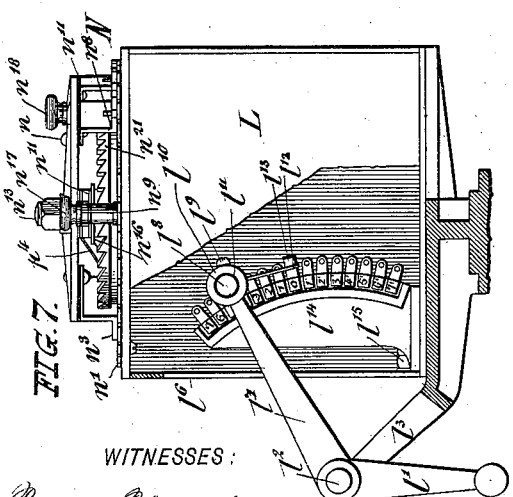
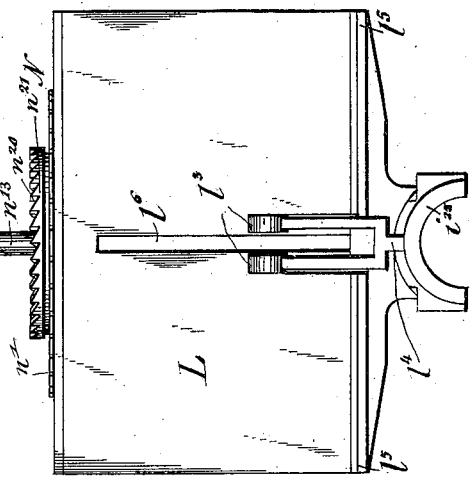
WITNESSES:
INVENTOR
Carl Eickemeyer
BY
ATTORNEYS.
THE NORRIS PETERS CO., PHOTO-LITHO., WASHINGTON, D. C.

No. 618,404. Patented Jan. 31, 1899.
C. EICKEMEYER.
ELECTRIC PUMP.
(Application filed Jan. 22, 1898.)
(No Model.) 6 Sheets—Sheet 5.
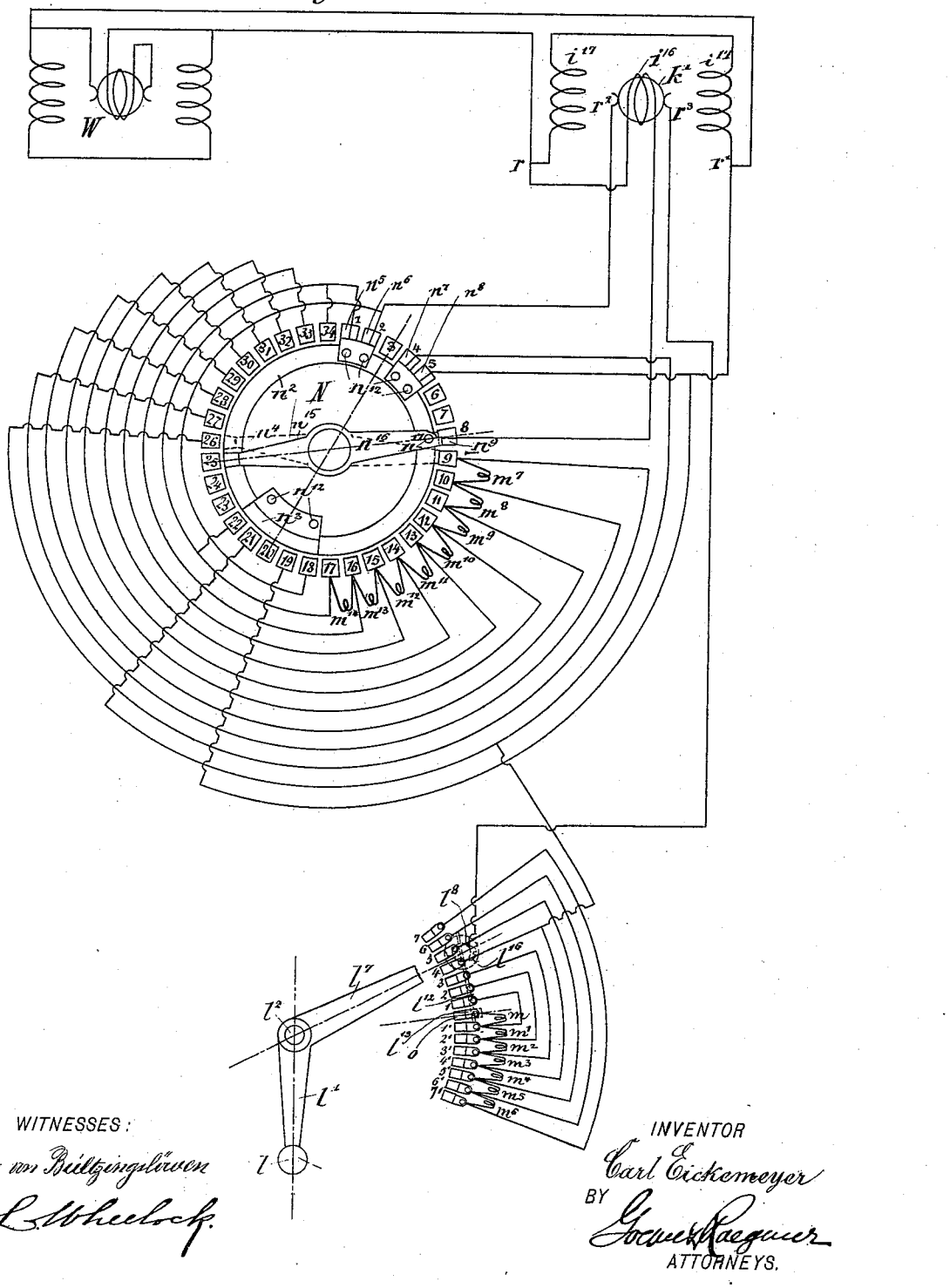
Fig: 11.
WITNESSES:
INVENTOR
Carl Eickemeyer
BY
ATTORNEYS.

No. 618,404. Patented Jan. 31, 1899.
C. EICKEMEYER.
ELECTRIC PUMP.
(Application filed Jan. 22, 1898.)
(No Model.) 6 Sheets—Sheet 6.

WITNESSES:
INVENTOR
Carl Eickemeyer
BY
ATTORNEYS.

UNITED STATES PATENT OFFICE.

CARL EICKEMEYER, OF YONKERS, NEW YORK.

ELECTRIC PUMP.

SPECIFICATION forming part of Letters Patent No. 618,404, dated January 31, 1899.

Application filed January 22, 1898. Serial No. 667,583. (No model.)

*To all whom it may concern:*

Be it known that I, CARL EICKEMEYER, a citizen of the United States, residing at Yonkers, in the county of Westchester and State of New York, have invented certain new and useful Improvements in Electric Pumps, of which the following is a specification.

The present invention relates to electric pumps or pumping machinery in which an electric motor forms the support of the pump and which is directly connected to the same by means of a worm or gear in such manner as to obviate the necessity of introducing relief-valves and by which is produced as highly an efficient pumping-machine (with a flexible coupling between the pump and the motor) as that found in the belt-connected pumps, whereby all jars from water-hammer, slamming of the pump-valves, &c., are not directly transmitted to the motor through the connecting driving mechanism. This feature of the invention not only insures steady operation, but greatly increases the life of the machine and at the same time allows the motor to be started without load, thereby taking the smallest possible amount of starting-current. The load is gradually applied to the motor as the speed increases, the maximum load being received at the time that the maximum speed is attained. To reach the desired result, I have devised relief-springs, which are carried by a worm-shaft and permit the axial motion of the worm, which is, as it were, a combination of the motion of the worm and that of a rack. This axial rack motion is independent of the rotation of the armature of the motor, which armature is mounted on a sleeve in which the worm-shaft is feathered. Said independent rack motion is proportionate to the load applied to the motor and which I use as a dynamometric regulation for the motor in either automatically varying a set of resistances in the armature-circuit or automatically changing the direction and intensity, or both, of the series field. Should the motor be stopped with one of its relief-springs contracted under load, the current in the armature is automatically changed through the medium of a reversing starting-switch before the pump can again be started. By starting the motor in the opposite direction all the expanding motion of the compressed spring and the contracting motion of the opposite spring give sufficient range to start the motor without load and to reach its highest speed by the time the maximum load is applied. At the time the maximum load is reached the normal running speed is also reached, the armature-resistance has been gradually cut out, and the counter electromotive force has risen to its maximum degree and has cut down the armature-current to a safe limit. Should the load for any unforeseen reason be suddenly thrown on the motor at any time, a set of safety-resistances are thrown into the armature-circuit in order that the current in the armature may not be suddenly increased by a consequently sudden decrease of speed. On the other hand, should at any time the load be suddenly taken off the motor the speed will remain practically constant, as the armature-resistance is automatically thrown in the circuit before the armature can respond to any sudden decrease in the load.

The series regulation is used in a modified system of regulation in which the coils at starting exert a magnetizing effect on the armature and are gradually cut out as the motor rises to speed, while at the time the normal running speed is reached the series coils are cut out. In this system of regulation should the load be suddenly increased the series coils which have been previously cut out are at once thrown in, but in this instance exert a demagnetizing effect on the armature, which lowers the counter electromotive force, increases the armature-current, and thereby raises the speed. On the other hand, when the load is suddenly decreased the series coils are thrown in, exerting a magnetizing effect on the armature, which in turn increases the counter electromotive force, thereby reducing the current in the armature and lowering the speed to its normal rate. When the motor is running at no load, the magnetization is at its maximum.

A combination of both regulation devices might successfully be used; but for simplicity of construction either one or the other can be used.

Another novel feature of the construction—namely, that of the motor—is in the winding of the field-coils, which in the shunt-field are wound so that the outer portions of the coils are approximately one-half the thickness or horizontal width of the inside portions of the coils. This allows the flattening of the coils on the inside to get the motor as thin as is desirable and at the same time makes the outside wires of the outer side of the coils effective, which would otherwise be ineffective, in producing magnetic "lines of force" in the field-core. The series regulating-coils are made rectangular without bend and directly magnetize or demagnetize the armature, as the case may be. The worm and gear run entirely in oil, the gear-casing being cut away in the center to allow the parts of the crank-shaft which are carried by the gear to be attached to either side of the gear. The gear is provided on either side with a groove which prevents any oil from running out onto the cranks, the oil finding its way back to the well in which the worm runs. The jars, which would otherwise exert undue wear on the worm and gear, are taken up by the relief-springs and thus prevent the lubricant from being forced out from between the worm and gear. The disks forming the supports of the relief-springs are provided with frictionless bearings to insure the greatest possible degree of sensitiveness between the worm-shaft and the armature-sleeve in which the worm-shaft is fitted, so as to have an axial or rack motion only with relation to the same, the independent rotary motion being prevented by a feather, which might also have a series of balls on either side of it to produce a frictionless bearing for the same.

In order that my invention may be more fully understood, I will now proceed to describe the same with reference to the accompanying drawings, in which—

Figure 2:
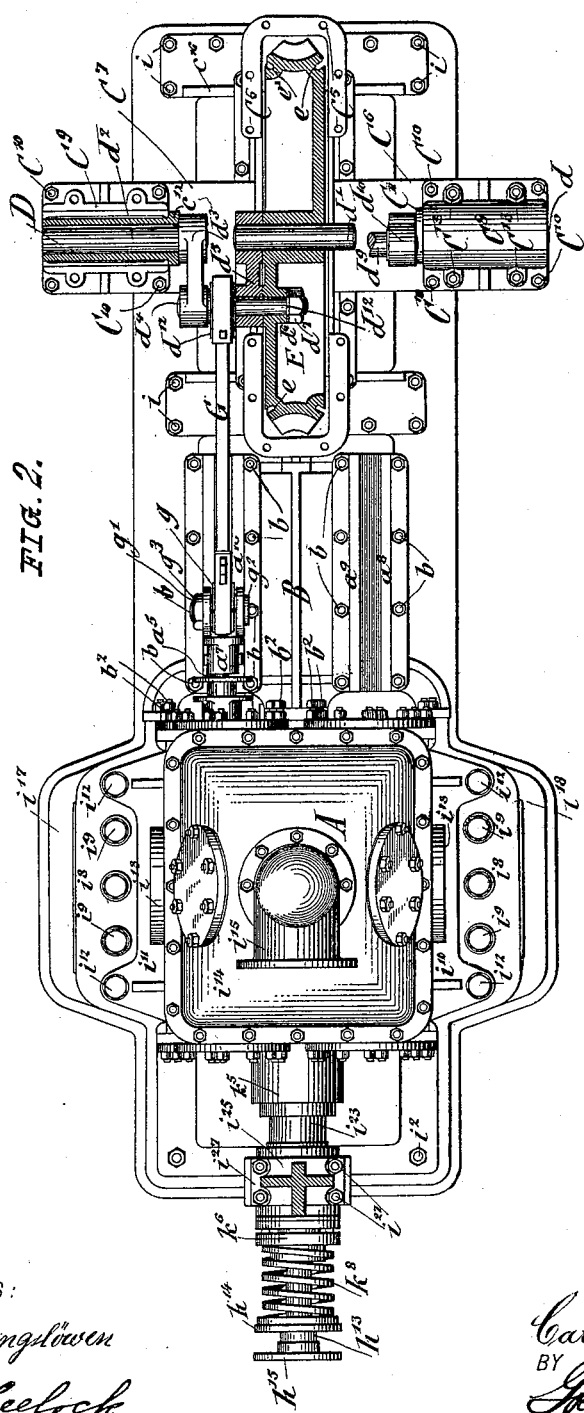
Figure 12:
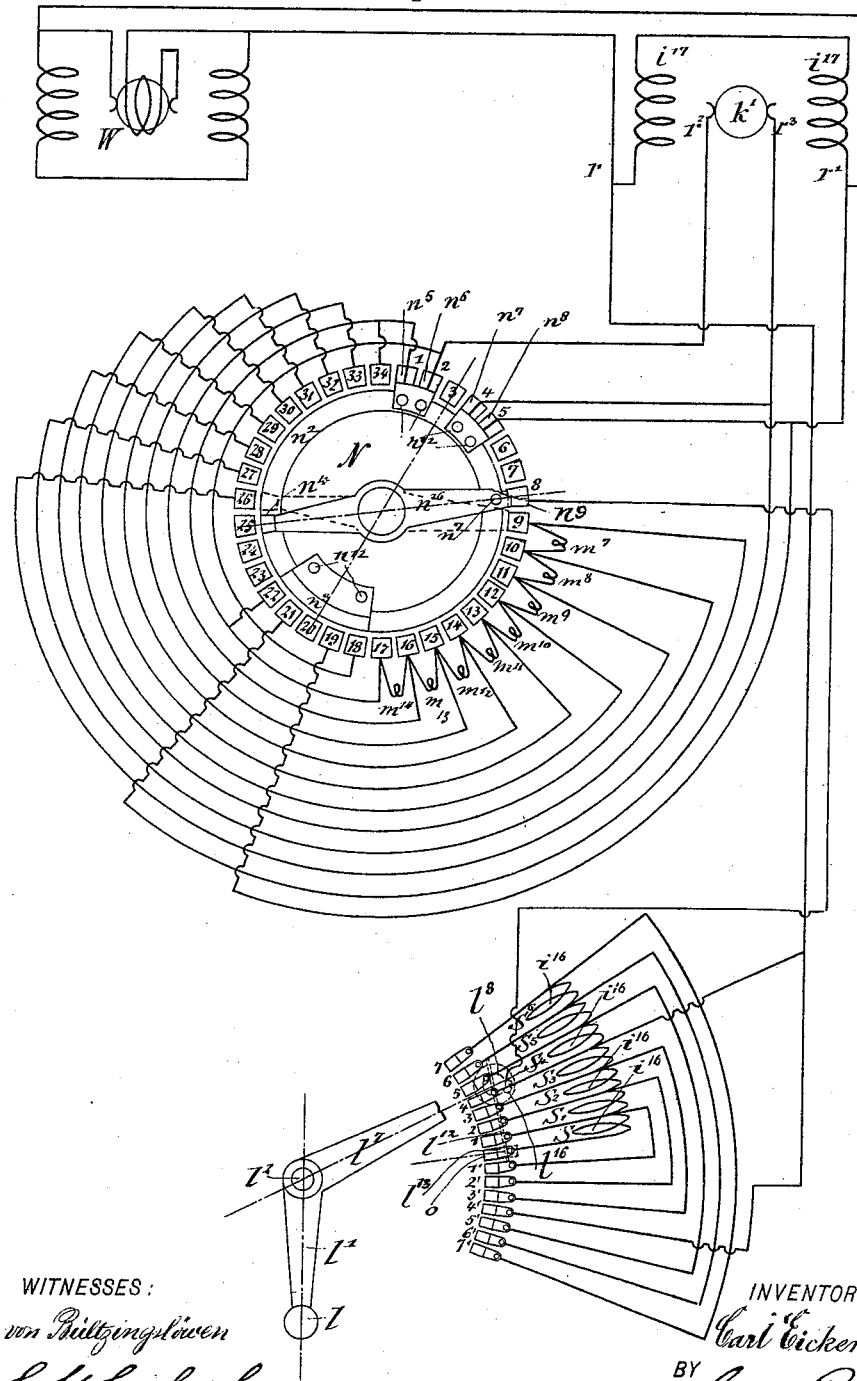

Figure 1 is a vertical longitudinal section of my improved electric pump, parts being in elevation and parts broken away. Fig. 2 is a plan view of the electric pump, parts being in section and parts removed to show underlying parts. The gear is here sectioned horizontally through the axis of the crank-shaft to show the casing, the oil-grooves in the gear, and the construction of the cranks. Fig. 3 is an end elevation looking toward the motor. Fig. 4 is a vertical transverse section on line 4 4 of Fig. 1. Fig. 5 is a transverse section through the cross-head guide-support. Fig. 6 is an end elevation, parts being broken away and parts in section, of the worm-well, gear-casing, and bracket supporting the bearings for the gear, worm-shaft, and crank-shaft. Fig. 7 is a side elevation, parts being broken away, of the resistance-box, upon which is mounted the starting and reversing switch. Fig. 8 is a rear elevation of the same, parts of the switch being removed. Fig. 9 is a plan view of the starting and reversing switch, partly broken away. Fig. 10 is a vertical central section of the starting and reversing switch, taken through the reversing-lever. Fig. 11 is a diagrammatic view of the electric connections, showing the generator, motor reversing and starting switch, and safety armature-resistance, which is regulated by the motor dynamometrically; and Fig. 12 is a similar diagram in which the safety series coil is regulated dynamometrically.

Similar letters and numerals of reference indicate corresponding parts.

Referring to the drawings, A represents the pump-casing, which contains suction-valves $a$ and delivery-valves $a'$, which are opened and closed through the medium of the action of the plungers $a^2$, carried by the plunger-rods $a^4$ $a^5$, which are respectively fastened to the cross-heads $a^6$ and $a^7$. (See particularly Figs. 1 and 2.) The said cross-heads $a^6$ and $a^7$ are reciprocated in guides $a^8$ $a^9$ and $a^{10}$ $a^{11}$, respectively, which are bolted to guide-support B by means of bolts $b$. The support B is held rigidly to the pump-casing A by means of the piston-head nuts $b^2$, while on the opposite end cross-head support B is supported by bolts $b^3$, which pass through flange $C^\times$ of the worm and gear casing C, which is composed of an upper shell $C'$, provided with flange $C^2$, which is secured to flange $C^3$ of the lower shell $C^4$ by means of bolts $C^5$. The lower shell $C^4$ of the worm and gear casing C carries on each side brackets $C^6$ and $C^7$, respectively, upon which are mounted boxes $C^8$ and $C^9$ by means of bolts $C^{10}$. The boxes $C^8$ and $C^9$, respectively, carry bushings $C^{11}$ and $C^{12}$, which are clamped in the boxes by means of bolts $C^{13}$. The bushings $C^{11}$ and $C^{12}$ form bearings for the crank-shaft D, which is composed of three parts $d$, $d'$, and $d^2$, said shaft-section $d^2$ carrying a crank $d^3$, which carries a crank-pin $d^4$, that is held rigidly to crank $d^5$ and gear E by means of nut and washer $d^6$ and $d^7$, respectively. The inner end of said crank-pin $d^4$ is preferably made slightly tapering, so that it can bind more firmly in the crank $d^5$ and the gear E. Said crank $d^5$ is also carried by the shaft-section $d'$, upon which is mounted the gear E, which is made of the shape as shown in cross-section, so as to be as light as possible. The gear E is provided with annular oil-grooves $e$ and $e'$, formed at each side thereof near the peripheral teeth, which grooves prevent any oil from running out onto the cranks and cause the oil to find its way back into the worm-well shell $C^{14}$. Shaft $d'$ also carries crank $d^8$, which in turn is fastened to gear E by means of crank-pin $d^9$ in the manner similar to that already shown in relation to crank-pin $d^4$, said crank-pin $d^9$ being carried by crank $d^{10}$, which is rigidly carried by shaft-section $d$.

Upon the crank-pin $d^9$, which is arranged at an angle of ninety degrees in advance of crank-pin $d^4$, are carried boxes $d^{11}$ of the connecting-rod F, which carries boxes $f$ on the cross-head pin $f'$, while the crank-pin $d^4$ carries boxes $d^{12}$ of the other connecting-rod G, the other end of which carries boxes $g$ on the cross-head pin $g'$, which is held in position by the flange $g^2$, formed thereon, and the nut $g^3$.

The shell $C^4$ is fastened to the worm-well shell $C^{14}$ by means of bolts $C^5$, and the worm-well shell $C^{14}$ and said shell $C^4$ clamp the bearing-bushings $h$ and $h'$, in which the worm-shaft $h^2$, provided with worm H, turns, said worm meshing with the teeth of gear E. The worm-well shell $C^{14}$ forms the combined or partial support of the cross-head support B, the upper shell $C'$, shell $C^4$, carrying bearings for gear E, worm-shaft $h^2$, and oil-well $h^3$. The worm-well shell $C^{14}$ is supported on brackets $C^{15}$ and $C^{16}$, held in position on the main bedplate I of the apparatus by means of connecting-bolts $i$. The bed-plate I at the opposite end supports the motor K, which is held in position on the bed-plate by means of bolts $i'$ and $i^2$, $i^3$ and $i^4$, secured to brackets $i^{19}$ and $i^{20}$, which form a part of the lower portion of the motor K, said motor consisting of magnetic cores $i^5$ and $i^6$ and lower pole-pieces $i^7$, and said brackets $i^{19}$ and $i^{20}$ carrying boxes $i^{21}$ and $i^{22}$, respectively, which in turn carry bearing-bushes $i^{23}$ and $i^{24}$, respectively, in which is journaled the sleeve $k$, upon which is mounted the armature $k'$. The upper halves $i^{25}$ and $i^{26}$ of the boxes $i^{21}$ and $i^{22}$ are secured to the latter by bolts $i^{27}$. The armature $k'$ is of the familiar construction, consisting of laminated wrought-iron disks held by clamps $k^2$ and $k^3$, $k^4$ representing a coil of armature-winding and $k^5$ showing the position of the commutator, the commutator-brushes or brush-holder not being shown. The upper pole-piece $i^8$ of the motor is fastened to magnetic cores $i^5$ and $i^6$, respectively, by means of bolts $i^9$, while pump-casing A, which is provided with supporting-brackets $i^{10}$ and $i^{11}$, is fastened to the pole-piece $i^8$ by means of bolts $i^{12}$, passing through said brackets.

The pump-casing A has a suction-chamber at $i^{13}$ and a delivery at $i^{14}$ into coupling $i^{15}$; but this is immaterial, as any pumping mechanism for any fluid can be applied in place of the hydraulic pump here shown. Upon the pole-pieces $i^7$ and $i^8$ are wound flat rectangular regulating-coils $i^{16}$, which both magnetize or demagnetize, as the case may be, both the armature and the field-magnet cores $i^5$ and $i^6$. The field-magnet coils $i^{17}$ and $i^{18}$ are wound upon the cores $i^5$ and $i^6$, so that the outer portions of the coils are about one-half the thickness or horizontal width of the inner portions of the coils, for the purpose before stated, so that the outside wires of the coils which are farthest from the armature are all effective in magnetizing the cores $i^5$ and $i^6$.

The box $i^{22}$ and its upper half $i^{26}$, in which is fitted the bush $i^{24}$, in which the armature-sleeve $k$ turns, are formed with an oil-groove $i^{28}$ on the side toward the armature, into which extends the oil-bell $i^{29}$, mounted on said armature-sleeve $k$. On the ends of the armature-sleeve $k$ are fixed flanged hubs $k^6$ and $k^7$, the flanges of which support helical relief-springs $k^8$ and $k^9$, respectively, the inner faces of said hubs being provided with annular grooves, in which bear balls $k^{12}$ and $k^{13}$, respectively, and the opposite bearings for said balls being in grooves of steel collars $k^{16}$ and $k^{17}$, respectively, which are arranged and bear upon the bushes $i^{23}$ and $i^{24}$, in which the armature-sleeve $k$ turns. The opposite end of the spring $k^9$ bears against flange $k^{18}$ of hub $k^{19}$, which is provided with a flange $k^{20}$, that bears against collar $k^{21}$ of part $h^4$ of the worm-shaft $h^2$, said flange $k^{20}$ being bolted to the flange $h^5$ by means of bolts $h^6$, this flange $h^5$ being formed on hub $h^7$, that is set on the end of the worm-shaft $h^2$ by means of pin $h^8$. The worm-shaft $h^4$ is provided with feathers $h^9$ and $h^{10}$, preferably in two short parts for convenience in construction and which work in their respective grooves $h^{11}$ and $h^{12}$ in the armature-sleeve $k$. These feathers may be made frictionless by the introduction of a series of balls on either side, as is evident without particular illustration.

On the outer end of the worm-shaft $h^4$ is arranged a flanged hub $h^{13}$, which is provided with a flange $h^{14}$, that forms a support for the end of spring $k^8$, the other side of which forms a bearing-surface for the knob or disk $l$ on the lower end of a bell-crank lever $l'$, that is pivoted to the fork $l^3$ of a bracket $l^4$, which is carried by the upper half $i^{25}$ of box $i^{21}$. The hub $h^{13}$ is also provided with flange $h^{15}$, which forms the opposite bearing-surface for the disk $l$ of the bell-crank lever $l'$. The upper half of the box $i^{25}$ also carries bracket $l^5$ for the support of the regulation resistance-box L, which is slotted at $l^6$ to admit the upper arm $l^7$ of bell-crank lever $l'$.

Referring to Figs. 7 to 10, inclusive, particularly Fig. 7, the arm $l^7$ of bell-crank lever $l'$ carries a rod $l^8$, held in a hub or socket $l^{10}$ of the bell-crank lever by means of a set-screw $l^9$, said rod being insulated from said hub by insulation $l^{11}$. The rod $l^8$ carries brush $l^{12}$, which in turn carries carbon blocks $l^{13}$ at its outer end, which blocks bear on the arc-shaped series of regulation-brushes 0 to 7 and 0 to 7'. These carbon blocks are connected with the armature resistance-coils $m$, $m'$, $m^2$, $m^3$, and $m^4$ in series on either side of no-load position of the worm-shaft. (See Fig. 11.) The resistance terminal blocks 7 0 7', between which there is suitable insulation, are mounted on a support $l^{14}$, arranged in box L and fastened to the bottom thereof by means of suitable bolts $l^{15}$. The rod $l^8$, which is carried by the bell-crank lever $l^7$, is furnished with a set-screw $l^{16}$, by which connection is made with the armature-circuit in the case of the system of connection shown in Fig. 11. On top of the box L is mounted a reversing starting-switch N, which is composed of a range of blocks $n'$, consisting of blocks 1 to 34, inclusive, set in circular series around and concentric with a contact-ring $n^2$, both being arranged around a common center $n^{13}$. Adapted to move upon the range of contact-blocks $n'$ are sliding brushes $n^5$ $n^6$ $n^7$ $n^8$ $n^9$, while arranged to slide upon contact-ring $n^2$ are brushes $n^3$ and $n^4$. The brushes $n^5$ and $n^6$ are made of one piece and are carried by one end of lever $n^{10}$, from which the brushes are insulated by means of insulation $n^{11}$, said brushes $n^5$ and $n^6$ being connected by means of rivets $n^{12}$ to said lever. The brushes $n^7$ and $n^8$ are also of one piece, being insulated from the lever $n^{10}$ by the insulation $n^{11}$ and connected to said lever by means of rivets $n^{12}$. The brush $n^3$, which is arranged upon the opposite end of lever $n^{10}$, is merely for the purpose of equalizing the pressure of brushes $n^5$, $n^6$, $n^7$, and $n^8$ and has no function to perform electrically. The lever $n^{10}$ is mounted on a central pin $n^{18}$, which is secured to the top of the resistance-box $l$ by means of a nut and washer $p'$ and a collar $p^2$ on said pin, while the lever is confined on the pin by means of a nut $p$. The hub of the lever $n^{10}$ furnishes a bearing for the hub $n^{14}$ of lever $n^{15}$, which is provided with a plate $n^{16}$, that connects the brushes $n^4$ and $n^9$. The lever $n^{10}$ is turned by means of a knob $n^{18}$, and the lever $n^{15}$ is turned by a knob $n^{17}$, which knob connects the latter with plate $n^{16}$, between which the insulation $n^{11}$ is inserted. The lever $n^{10}$ carries pawl $n^{19}$, which is held by means of a spring $n^{22}$ against the teeth $n^{20}$ of a circular ratchet $n^{21}$, that is arranged concentrically within the contact-ring $n^2$, said pawl $n^{19}$ having its fulcrum on screw $n^{23}$, while spring $n^{22}$ is held in position by means of screw $n^{24}$. The ratchet $n^{21}$ is held in position by screws $p^3$ and carries a movable stop $p^4$, which is fulcrumed on screw $p^5$, upon the rear projecting fork $p^6$ of which stop rests a spring $p^7$, held by screw $p^8$.

In both systems shown in Figs. 11 and 12 and in which W indicates the generator the shunt-wound motor is used, the circuit-terminals being shown at $r$ $r'$, where the current divides, part flowing through the shunt-coils $i^{17}$ and part through the armature $k'$ and the series coils $i^{16}$. The terminals from the series coils are connected to contact-block 8 of the switch and with terminal $r$, the block 8 being in turn connected to the inner ring $n^2$, which is in constant connection with the brush $n^4$, which moves over it. The return-blocks 9 and 10, 26 and 27, 10 and 11, 27 and 28, 11 and 12, 28 and 29, 12 and 13, 29 and 30, 13 and 14, 30 and 31, 14 and 15, 31 and 32, 15 and 16, 32 and 33, and 16 and 17, 33 and 34 are provided with armature-resistances $m^7$, $m^8$, $m^9$, $m^{10}$, $m^{11}$, $m^{12}$, $m^{13}$, and $m^{14}$. The block 17 is connected to blocks 22, 34, and 1, where by means of brushes $n^5$ $n^6$ blocks 1 2 are connected, the latter being connected with commutator-brush $r^2$ and block 18, and commutator-brush $r^3$ being connected with brush $l^{12}$, which bears upon the resistance terminal blocks in the box L. The resistances $m$, $m'$, $m^2$, and $m^3$ are now in series between blocks 0, 1', 2', 3', 4' and 0, 1, 2, 3, and 4, respectively, blocks 4 and 4' being connected to blocks 21 and 4 of switch N, while by means of brushes $n^7$ and $n^8$ blocks 4 and 5 are connected, the block 5 being connected to the terminal $r'$ and block 1.9

The system shown in Fig. 12 is similar to that just described and shown in Fig. 11, with the exception that the series coils $i^{16}$ are shown in part connected to blocks 7, 6, 5, 4, 3, 2, 1, 0, 1', 2', 3', 4', 5', 6', and 7', with the block 8 of the switch connected to brush $l^{12}$, which is carried by the lever $l'$. Blocks 4 and 4' in box L are connected to terminal $r$ and commutator-brush $r^3$ is connected to blocks 4 and 21 of the reversing starting-switch, with the result that the current is only reversed through the armature, the direction of the current in the series coils being the same in all cases, as is the resistance in the armature-circuit—that is to say, $m^7$, $m^8$, $m^9$, $m^{10}$, $m^{11}$, $m^{12}$, $m^{13}$, and $m^{14}$.

The working circuits of the reversing starting-switch may be briefly described as follows:

Referring to Fig. 11, starting with terminal $r$ the current from the generator W is divided, part going through motor-field coils $i^{17}$ to terminal $r'$ and part going through series coils $i^{16}$ to block 8, to ring $n^2$, through brush $n^4$ and plate $n^{16}$ to brush $n^9$, to block 9, (brush $n^9$ being on block 9, see dotted lines,) through the resistance $m^7$, $m^8$, $m^9$, $m^{10}$, $m^{11}$, $m^{12}$, $m^{13}$, and $m^{14}$ to block 17, to block 1, through brushes $n^5$ and $n^6$ to block 2, to commutator-brush $r^2$, through armature $k'$ to commutator-brush $r^3$, to brush $l^{13}$, to block $o$, through dynamo-metric regulating resistances $m$ $m'$ $m^2$ $m^3$ to blocks 4 or 4', to block 4 of the starting-switch, and through brushes $n^7$ and $n^8$ to block 5, to terminal $r'$, back to generator W. In the second position, in which brush $n^9$ is on block 26, and, at the same time, brushes $n^5$ and $n^6$, $n^7$ and $n^8$, are respectively on blocks 18 and 19, 21 and 22, the circuit is as follows: Starting with terminal $r$ the current from the generator W is divided, part going through motor-field coils $i^{17}$ to terminal $r'$ and the other part going through series coils $i^{16}$ to block 8, to ring $n^2$, through brush $n^4$ and plate $n^{16}$ to brush $n^9$, to block 26, through block 9 and resistances $m^7$, $m^8$, $m^9$, $m^{10}$, $m^{11}$, $m^{12}$, $m^{13}$, and $m^{14}$ to block 17, to block 22, through brushes $n^8$ and $n^7$ (then on blocks 21 22) to block 21, to either blocks 4 or 4' of the dynamometric regulating-resistance, through resistances $m^3$ $m^2$ $m'$ $m$ to block $o$, to brush $l^{13}$, to commutator-brush $r^3$, through armature $k'$ (in opposite direction to hitherto-described circuit) to commutator-brush $r^2$, to block 18, through brushes $n^5$ and $n^6$ (then on blocks 18 19) to block 19, to terminal $r'$, and back to generator W.

Referring to Fig. 12 and starting at terminal $r$, the current from W is divided, part going through motor-field coils $i^{17}$ to terminal $r'$ and part going directly to either blocks 4 or 4', through the dynamometric series regulating-coils $i^{16}$ to block 8, to ring $n^2$, through brush $n^4$, plate $n^{16}$, and brush $n^9$ to block 9, (see dotted lines,) through resistances $m^7$, $m^8$, $m^9$, $m^{10}$, $m^{11}$, $m^{12}$, $m^{13}$, and $m^{14}$ to block 17, to block 1, through brushes $n^5$ and $n^6$ to block 2, to commutator-brush $r^2$, through armature $k'$ to commutator-brush $r^3$, to block 4, through brushes $n^7$ and $n^8$ to block 5, to terminal $r'$, and back to generator W. In the second position, in which brush $n^9$ is on block 26 and brushes $n^5$, $n^6$ and $n^7$ $n^8$ are respectively on blocks 18 19 and 21 22, starting with terminal $r$ the current from the generator W is divided, part going through motor-field coils $i^{17}$ to terminal $r'$ and part going to blocks 4 or 4' through the dynamometric series regulating-coils $i^{16}$ to block 0, through brush $l^{13}$ to block 8, to ring $n^2$, through brush $n^4$, plate $n^{16}$, and brush $n^9$ to block 26, to block 9, through resistances $m^7$ $m^8$ $m^9$ $m^{10}$ $m^{11}$ $m^{12}$ $m^{13}$ $m^{14}$ to block 17, to block 22, through brushes $n^8$ and $n^7$ to block 21, to commutator-brush $r^3$, through armature $k'$ (in opposite directions to that just before described) to commutator-brush $r^2$, to block 18, and through brushes $n^5$ and $n^6$ to block 19, to terminal $r'$, and back to generator.

The starting device, the dynamometric regulation, and consequently the operation of the pump and operating mechanism can be best described by beginning with the reversing starting-switch. The reversing-switch $n^{10}$, with its brushes $n^5$, $n^6$, $n^7$, and $n^8$, being in the position shown in Fig. 11, the current in the armature-circuit will be broken between the brush $n^9$ and block 9. The dynamometric regulation-brush $l^{12}$ is in the position of no load on the motor, that position of the brush corresponding to the intermediate position of the relief-springs $k^8$ and $k^9$, which act on the worm-shaft. In this position the springs exert either no pressure or both exert the same pressure—that is to say, they neutralize each other. The current in the armature-circuit is now completed by moving the brush from block 8 to block 9. The current is shunted at $r$, part going through the field-coils $i^{17}$ to terminal $r'$ and part going through the series coils $i^{16}$, from which the line passes to block 8. Block 8 is connected to contact-ring $n^2$ by a wire, as shown, and this ring having continuous contact with the brush $n^4$, then when brush $n^9$ is moved from block 8 to block 9 the circuit through the armature is completed in one direction, taking in the resistances, respectively, $m^7$ to $m^{14}$ and the dynamometric regulating-resistance $m$ to $m^4$. The resistance $m^7$ to $m^{14}$ is now gradually cut out, as the motor rises to speed, by moving brush $n^9$ to block 17 in a clockwise direction, a movement in anticlockwise direction past block 9 being prevented by stop $p^4$, so that the current must now be broken by moving brushes $n^5$, $n^6$, $n^7$, and $n^8$ where circuit is broken between blocks 1 and 2 and 4 and 5. The current after passing through the resistance $m^7$ to $m^{14}$ then passes to block 1, through brushes $n^5$ and $n^6$ to block $n^2$, where it goes to the armature-commutator $r^2$, through armature $k'$, (from right to left, it may be said,) then to brush $l^{13}$, from whence it goes through resistance $m$, $m'$, $m^2$, and $m^3$, then to block 4 of the reversing starting-switch, where, by means of brushes $m^7$ and $m^8$, it passes to block 5, from which it passes to shunt-terminal $r'$. The maximum load having been gradually applied as the speed of the motor increases, the smallest possible starting-current will be used. The load at any time being exerted by the gear to the worm and transmitted by the latter to the relief-springs, the travel of the worm-shaft is proportionate to the load applied to the motor by the pump-plungers. Should at any time the load be suddenly increased, the working or relief spring responds at once, and the resistance $m^4$, $m^5$, and $m^6$ is thrown into the armature-circuit, so as to prevent any increased current from flowing through the armature. Should the load be suddenly taken off the motor, resistances $m$, $m'$, $m^2$, and $m^3$ are thrown into circuit and the speed thereby reduced. As the lever $n^{15}$, which carries the block $n^9$, passes over the space between the blocks 8 and 9 the stop $p^4$ prevents the circuit from being broken by any anticlockwise rotation of lever $n^{15}$ beyond block 9 or 26, while in order to regulate the speed of the motor the said lever has a range from block 9 to block 17, it being prevented from being turned farther by inert brush $n^3$, carried by lever $n^{10}$. In order to stop the motor, the lever $n^{15}$ is turned anticlockwise until the stop is reached. The resistances $m^7$ to $m^{14}$ are now thrown in circuit, and the circuit cannot be broken otherwise than by moving lever $n^{10}$, which carries reversing-brush $n^5$, $n^6$, $n^7$, and $n^8$ in a clockwise direction, the ratchet $n^{21}$ and pawl $n^{19}$ preventing any anticlockwise movement. The reduced current is thereby broken between blocks 1 and 2, and the motor has now been stopped under load, and in order to again start the reversing-lever $n^{10}$ is turned, taking along with it the lever $n^{15}$ to the corresponding position diametrically opposite, where the current in the armature is reversed by contact of brushes $n^5$, $n^6$, $n^7$, and $n^8$ with blocks 18, 19, 21, and 22, respectively. In order to complete the circuit again, the brush $n^9$ is moved to block 26. Beginning again at the shunt-terminal $r$ the current flows to block 8, then to contact-ring $n^2$ through brush $n^9$ and into block 26, through resistances $m^7$ to $m^{14}$, inclusive, to block 22, through brushes $n^4$ $n^7$ to block 21, then through resistances $m$, $m'$, $m^2$, and $m^3$, respectively, to brush $l^{13}$, then to armature commutator-brush $r^3$, through armature $k'$ (from left to right, it may be said) to armature commutator-brush $r^2$, then to plate 18 through brushes $n^5$ and $n^6$ into block 19 to shunt-terminal $r'$. The compressed relief-spring of the worm-shaft is now gradually expanded with slight load, gradually decreasing until the spring is entirely expanded, when the motor will reach its speed before the full load is applied by the opposite relief-spring.

The second system of regulation (shown in

Fig. 12) is obtained by the series coils $i^6$, with the reversing starting-switch operating the same as before described, allowing the current in the armature-circuit in the series field to pass in the same direction, regardless of the direction of the current in the armature. The series coils $s$, $s'$, $s^2$, $s^3$, $s^4$, $s^5$, and $s^6$ are connected in series to the dynamometric regulating-blocks 0 1 and 0 1', 1 2 and 1' 2', 2 3 and 2' 3', 3 4 and 3' 4', 4 5 and 4' 5', 5 6 and 5' 6', and 6 7 and 6' 7'. The blocks 4 and 4' of the dynamometric regulating-blocks at the lower part of the figure are connected with the terminal $r$ and the brush $l^{12}$, the carbon block of which (shown as on the zero-block 0) is connected with the block 8 of the reversing starting-switch N. In starting the motor without load the series coils $s$ $s'$ $s^2$ $s^3$ are exerting a magnetizing effect upon the armature and field magnets, and their magnetic effect is gradually decreased as the load increases with the speed, by reason of course of the action of the worm-shaft on the brush-actuating lever $l'$. If the motor is running under load and the carbon blocks of the brush $l^{12}$ have passed to or near the blocks 4 and 4', the series-coils are cut out. If when the motor is running under load the load for some unforeseen reason is increased, the coils $s^4$, $s^5$, and $s^6$ are thrown in the armature-circuit, the increased current in which exerts a demagnetizing effect upon the armature and the field-magnet cores and brings the speed back to its normal running position. On the other hand, if the load should be suddenly thrown off the motor the carbon blocks of brush $l^{12}$ will move inwardly toward the block $a$, and the series coils $s^3$, $s^2$, $s'$, and $s$ are thrown in the circuit and exert a magnetizing effect, and the motor will then be running light with no current running through the armature and the field magnetism at its maximum value or position.

The great advantage of this electric pump is that a motor is obtained which can be started without load, thereby taking the smallest possible starting-current. The use of relief-springs will prevent any sudden jar—such as that caused, for instance, by water-hammer or slamming of the valves common in pump machinery generally—from being thrown suddenly on the motor or on the pump-driving mechanism, which would otherwise squeeze out the lubricant of the gearing and greatly increase the wear of the working parts. The automatic dynamometric system of regulation prevents the motor from being affected by any sudden increase of current which would otherwise flow through the armature from any sudden increase of load. The automatic regulation also protects the motor against any racing that might occur by suddenly throwing the load off the motor. This system of regulation might also very readily be made, so as to automatically stop the motor under certain pressure, and thereby adapt the machine to hydraulic-pressure service or hydraulic-elevator service, and thereby do away with an inefficient boiler and steam-pump in many cases where an electric current is attainable and a hydraulic elevator is desirable over the electric.

The complete machine takes up about the same area as a hydraulic duplex pump of similar capacity and does the same work with only about fifty per cent. of the power of the former. It is evident that the construction can also be used with air or gas compressors or other fluid-pumps with equal advantage.

Having thus described my invention, what I claim is—

1. The combination, with an electric motor, provided with vertical field-magnet cores, of the incased pumping mechanism driven by said motor, the casing being supported by said field-magnet cores, and the piston-rods and armature-shaft being substantially parallel, a worm connected with the armature-shaft, and a suitably-supported gear-wheel intermeshing with said worm and connected with the piston-rods of the pumping mechanism, substantially as set forth.

2. The combination, with an electric motor, having a horizontal armature-shaft, of a pump provided with horizontal cylinders and pistons and mounted on a pole-piece of the motor, the piston-rods being also horizontal and extending in the same direction as the armature-shaft, a worm connected with the armature shaft, and a suitably-supported gear-wheel intermeshing with said worm and connected with the pistons of the pumping mechanism, substantially as set forth.

3. The combination with an electric motor having a longitudinally-yielding shaft for driving the armature, of pumping mechanism and gearing connecting said shaft with the pumping mechanism whereby a flexible coupling is obtained between the motor-shaft and the pumping mechanism, substantially as set forth.

4. The combination, with an electric motor, of a driving-shaft, and a relief-spring arranged to act on the armature-shaft of the motor through said driving-shaft, substantially as set forth.

5. The combination, with an electric motor, the armature of which is mounted on the shaft of said motor, of an auxiliary longitunally-movable driving-shaft, and a relief-spring arranged between the armature-shaft and the auxiliary driving-shaft, substantially as set forth.

6. The combination, with an electric motor, of pumping mechanism, and means for transmitting motion from the armature of the motor to the pumping mechanism, the same comprising a spring-controlled worm-shaft movable longitudinally of the armature, and a gear intermeshing with the worm of the shaft and transmitting motion from the latter to the pumping mechanism, substantially as set forth.

7. The combination, with an electric motor, the armature of which is mounted on the shaft thereof, of an auxiliary driving-shaft, relief-springs mounted between the armature-shaft and the auxiliary driving-shaft, and frictionless thrust-bearings between the armature-shaft and the bearings of the same, substantially as set forth.

8. The combination, with the pumping mechanism, and the gear-casing forming the support of part of the driving mechanism of the same, of a motor, and a gear and worm turning in said casing, said worm having a combined worm and ratchet motion, substantially as set forth.

9. The combination of the pumping mechanism, and the motor, on one of the pole-pieces of which the casing of said pumping mechanism is supported; with means for communicating motion from the armature of the motor to the pumping mechanism, the same comprising a worm-shaft having the characteristics of both a worm and a ratchet or rack, means for yieldingly supporting said worm-shaft in a longitudinal direction, and a gear intermeshed by the worm and transmitting motion to the pumping mechanism, substantially as set forth.

10. The combination, with an electric motor, pumping mechanism, and means for transmitting motion from the motor to the pumping mechanism, the same comprising a worm and gear, of the housing or casing for said worm and gear, which is constructed to form brackets for the support of the gear-shaft bearings and the worm-shaft bearings, substantially as set forth.

11. The combination, with the oil-well, and a worm running in said oil-well, of a housing, and a gear running in said housing and meshing with said worm, said gear being provided with means whereby the oil taken from the well is returned from the gear to the well, substantially as set forth.

12. The combination, with the oil-well, and a worm running in said oil-well, of a housing, and a gear running in said housing and meshing with said worm, said gear being provided with an annular groove near its peripheral teeth, whereby the oil is returned to the well, substantially as set forth.

13. A gear, provided with an annular groove near its teeth for returning the lubricant for the teeth and preventing the same from passing onto the gear-shaft, substantially as set forth.

14. The combination, with a motor, and a worm driven by the shaft of said motor, of a gear driven by said worm and provided with cranks which are attached to and form a part of the gear on each side, said cranks carrying in turn the journaled shafts, substantially as set forth.

15. The combination, with an electric motor, the armature of which is mounted on the shaft of said motor, and an auxiliary longitudinally-movable driving-shaft, of relief-springs mounted between the armature-shaft and the auxiliary shaft, the expansion and contraction of which springs furnish a system of dynamometric regulation for the motor, substantially as set forth.

16. The combination, with an electric motor, and a sleeve-shaped shaft on which the armature of the motor is mounted, of an auxiliary driving-shaft on which said armature-shaft is arranged, means for permitting the relative longitudinal movement of said auxiliary shaft in said armature-shaft, for causing the rotation of said shaft by the rotation of the armature-shaft, and means for resiliently and yieldingly supporting the auxiliary shaft in its longitudinal movement, substantially as set forth.

17. The combination, with an electric motor, of field-coils wound on the magnetic poles, the thickness of the coils on one side being in a fixed ratio to the thickness of the same coils on the opposite side, while the depth of the coils on one side is in a fixed inverse ratio to the depth of the coils on the opposite side, as and for the purpose specified.

18. The combination of a motor, field-coils wound on the magnetic poles so that the thickness of the coils on one side is in a fixed ratio to the thickness of the same coils on the opposite side, while the depth of the coils on one side is in a fixed inverse ratio to the depth of the coils on the opposite side, and flat, rectangular, series coils for magnetizing or demagnetizing the armature field-magnets by means of dynamometric regulation, substantially as set forth.

19. The combination of a shunt-wound electric motor, a reversing starting-switch in the armature-circuit of said motor, whereby the circuit in the armature is reversed before starting, and an independent set of resistances in the armature-circuit, the automatic dynamometric variation of which produces the regulation of the said motor, substantially as set forth.

20. The combination of an electric motor, a reversing starting-switch composed of an annular range of blocks, a concentric ring, starting-resistances between the said blocks and the concentric ring, and contact-brushes forming contact between said ring and blocks, whereby the current in the armature of said motor after stopping is reversed before the circuit can again be completed, substantially as set forth.

21. The combination, with an electric motor, the armature of which is mounted on the shaft thereof, of an auxiliary longitudinally-movable driving-shaft turned by the shaft of the armature, a relief-spring acting on said auxiliary shaft, a series of resistance-blocks, and a traveling brush actuated through the medium of said auxiliary driving-shaft, whereby more or less resistance is thrown in the circuit, substantially as set forth.

22. The combination, with an electric motor, and a spring-controlled and longitudinally-movable power-transmitting shaft, movable relatively to the armature of a series of resistance-blocks, and a traveling brush moved across said blocks, under the action of said shaft, substantially as set forth.

In testimony that I claim the foregoing as my invention I have signed my name in presence of two subscribing witnesses.

CARL EICKEMEYER.

Witnesses:
GEO. EICKEMEYER,
JAMES S. FITCH.